United States Patent

Leibhard et al.

[11] Patent Number: 6,029,417
[45] Date of Patent: Feb. 29, 2000

[54] ANCHOR ROD FOR AN ATTACHMENT ANCHOR

[75] Inventors: Erich Leibhard, Munich; Wolfgang Ludwig, Schwabmünchen, both of Germany

[73] Assignee: Hilti Aktiengesellschaft, Schaan, Liechtenstein

[21] Appl. No.: 09/018,604

[22] Filed: Feb. 4, 1998

[30] Foreign Application Priority Data

Feb. 4, 1997 [DE] Germany .................... 197 04 002

[51] Int. Cl.$^7$ .................. E04B 1/38; E21D 20/00
[52] U.S. Cl. .................. 52/705; 52/698; 411/82; 411/387; 405/259.6
[58] Field of Search .................... 52/705, 698; 411/82.3, 411/82, 930, 387.2, 387.1; 405/259.6

[56] References Cited

U.S. PATENT DOCUMENTS

| | | | |
|---|---|---|---|
| 2,782,883 | 2/1957 | Rosan | 52/705 |
| 4,393,638 | 7/1983 | Sell et al. | 405/259.6 X |
| 4,652,193 | 3/1987 | Hibbs | 411/82.3 |
| 4,907,928 | 3/1990 | Beck et al. | 411/387.1 X |
| 5,649,789 | 7/1997 | Denz | 52/698 X |
| 5,735,653 | 4/1998 | Schiefer et al. | 411/82 |

FOREIGN PATENT DOCUMENTS

WO 82/04461  6/1981  WIPO .................... 405/259.6

*Primary Examiner*—Beth Aubrey
*Assistant Examiner*—Brian E. Glessner
*Attorney, Agent, or Firm*—Brown & Wood, LLP

[57] ABSTRACT

An anchor rod for an attachment anchor including a trailing region (1) provided with a load application element (2), and an anchoring region (4) submergeable in a hardenable inorganic and/or organic mortar mass and having a mixing section formed of a head portion (5) provided at its free end (6) with a cutter (7) extending substantially transverse to the axis (A) of the anchor rod, a transporting section (10) adjoining the mixing section, and a compression section (13) adjoining the transporting section (10), with the head portion (5) having a region (53), the outer diameter (c) of which is larger than the largest diameter (d) of the transporting and compression sections (10,13) of the anchoring region (4), and provided with a mortar mass transporting arrangement (9).

10 Claims, 2 Drawing Sheets

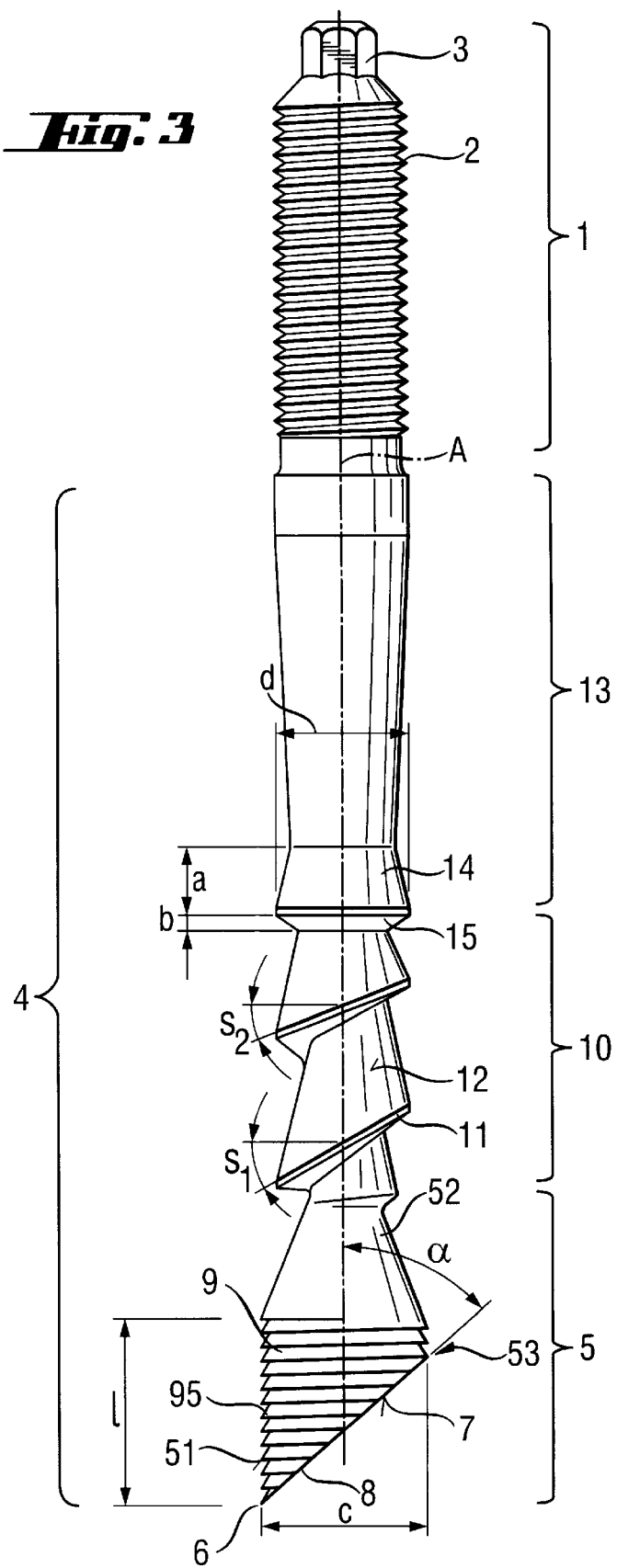

ANCHOR ROD FOR AN ATTACHMENT ANCHOR

BACKGROUND OF THE INVENTION

1. Field of Invention

The present invention relates to an anchor rod for an attachment anchor and which is secured with a hardenable organic and/or inorganic mortar mass in a receiving bore, includes an anchoring region and is provided with load application means.

2. Description of the Prior Art

Two anchoring methods proved themselves capable of providing a substantially expansion pressure-free attachment. One of the methods consists in that an anchor with expandable segments is secured in an undercut in the base of a receiving bore. The segments are swung out in the region of the undercut and retain the anchor axially by form-lockingly engaging the undercut. This attachment method is relatively expensive. First, a receiving bore needs to be formed, and then an undercut should be formed at a predetermined depth of the receiving bore with a special tool. Only then, the anchor can be set into the receiving bore. The swinging of the retaining segments is effected, for example, by axially pulling in or pressing out a cone. How much the attachment is expansion pressure-free is determined by an angle at which the bore wall extends in the transitional region between the bore and the undercut.

A simpler method of forming of expansion pressure-free attachments consists in securing of an anchor rod in a receiving bore with a hardenable organic or inorganic mortar mass. To this end, the receiving bore, after it is formed, is filled with a mortar mass. As a rule, the used mortar masses represent multi-component systems with reactive components and additives which should be stored separately from one another. The hardening reaction takes place only during the contact and mixing of the components with each other inside the receiving bore. The mortar mass components, which react with each other, are stored, e.g., in glass ampullas or in foil bags separately from each other, and are placed in a bore in these containers. With subsequent insertion of the anchor rod, the glass ampullas and the foil bags are broken, and the components contact each other. To insure firmness of the bonding mortar and to achieve a highest possible retaining value, it is important that the components of the mortar mass are well mixed with each other. Therefore, generally, the anchor rod is inserted in the receiving bore while being rotated about its axis. The profile of the anchoring region of the anchor rod should improve the intermixing of the components. In addition to intermixing of the components of the mortar mass, the anchor rod has another function, namely, to comminute the glass ampullas and/or the foil bags. This should be done to an extent which insures that the retaining value is not adversely influenced by large residual pieces of glass or foil adhered to the receiving bore wall.

While the known geometry of the anchor rod, as a rule, insures an adequate intermixing of the components and essentially satisfactory comminution of the component containing sheathes, a need in a further improvement exists. The comminution process should be affected more rapidly. The sheathes, in particular the foil bags, need to be comminuted to a greater extent. Deposition of the parts of the components of the mortar mass on the bottom of the receiving bore should be prevented to a greatest possible extent. The mortar mass should be mixed as homogeneously as possible and be distributed along the axial length of the anchoring region of the anchor rod. In equal measure, the flow of the mortar mass out of the receiving bore during the mixing process should be prevented. The trailing section of the anchor rod, which is provided with load application means, e.g., an outer thread, should remain free from the mortar mass. A further, not unimportant object of the invention is to provide an anchor rod for an attachment anchor which would have good secondary expansion characteristics in a fissure-prone bore. The anchor rod should have a geometry and a structure that would ensure a crack-proof capability of the attachment anchor. At that, the anchor rod should be capable of being secured in one step and should not require any additional auxiliary means besides a percussion drill tool for its setting.

SUMMARY OF THE INVENTION

These and other objects of the present invention, which will become apparent hereinafter, are achieved by providing an anchor rod for an attachment anchor including a trailing region provided with a lead application element, and an anchoring region submergible in a hardenable inorganic and/or organic mortar mass. The anchoring region is divided in three sections and has a mixing section formed of a head portion provided at its free end with a cutter extending substantially transverse to the axis of the anchor rod. A transporting section adjoins the mixing section and a compression section adjoins the transporting section. The head portion has a region, the outer diameter of which is larger than the largest diameter of the transporting and compression sections of the anchoring region, and is provided with mortar mass transporting arrangement.

The combination of features according to the present invention insures that the organic and/or inorganic mortar mass, which is put into the receiving bore, is deeply mixed and is distributed along the entire anchoring region. The cutter, which is provided at the free front end of the anchor rod, serves for breaking and comminuting the sheathes in which the mortar is stored. Because the head portion has a region with a larger outer diameter than the adjoining sections of the anchoring region, the clearance between the bore wall an the anchor rod is narrower in the region of the head portion than in the region of adjoining trailing sections.

The narrower annular clearance facilitates comminution of the mortar mass containing sheathes. This insures that the mortar can be stored in the glass ampullas or in foil bags. In particular, the narrower annular clearance promotes comminution of a foil when the mortar is stored in foil bags. The rotation of the anchor rod insures deep mixing of the mortar mass released from its sheath. At that, the narrower clearance favorably influences the mixing process. This is particularly advantageous when two or multi-component mortar systems are used, e.g. containing a resinous component and a hardener and, if necessary, a filling material, when a most possible homogenous intermixing of components is desired. The transporting arrangement, which is provided on the head portion transport the mixed mortar mass backwards toward the transporting section which adjoins the mixing section. From there, the mortar mass is quickly transported away from the frontmost portion of the anchoring region in order to prevent the already well mixed mortar part from remaining in the mixing section and from being overheated by further rotation of the anchor rod. The transporting of the mixed mortar away is facilitated by the different width of the annular clearance between the bore wall and the anchor rod along the axial length of the anchor rod, whereas along the axial depth of the bore, a pressure gradient is formed which favorably affects the distribution of the mixed mortar mass in the entire bore. The quick transportation of the mixed part of the mortar away insures that not yet mixed components of the mortar mass can reach the mixing section in order to be deeply intermixed with each other there. In the compression section of the anchoring region which adjoins the transporting section, the transporting process of the mortar mass is slowed down and is finally stopped. Thereby, it is insured that the well mixed mortar mass remains in the anchoring region of the anchor rod and does not flow out of the receiving bore and does not soil the section of the anchor rod provided with the load application means.

The outer diameter of the region of the head portion, which exceeds the largest diameter of the adjoining sections of the anchoring region, advantageously, amounts to from about 1.05 times to about 1.07 times of the largest diameter in the transporting section or in the compression section. With these diameter ratios, the contradictory tasks, a reliable comminution of the sheath, in particular of a foil, when foil sheathes are used, and a good intermixing of the mortar mass, on one hand, and a quick as possible transportation of the mixed mass away from the mixing section and its distribution along the anchoring region, on the other hand, are solved particularly well.

A coarse thread profile of the transporting region permits quick transportation away of a large amount of mortar which in this way is distributed along the entire anchoring region as uniformly as possible. The cone-like sections of the transporting section provide for secondary expansion behavior of the attachment anchor, e.g., in a torn concrete with a gaping bore, an lead to a better distribution of the expansion pressure along the length of the anchoring region.

For different functions of the mixing section, it is advantageous when the head portion conically widens toward the free end and opens into the largest diameter region, which is cylindrically shaped and carries the cutter at its free front end. The length of the cylindrical region takes up preferably from about 50% to about 75% of the axial length of the head portion. A narrow annular clearance between the cylindrical region and the bore wall extends along a relatively large portion of the axial length of the head portion. In this way, a large part of the head portion is available for the comminution of the sheath. The mortar mass remains in the narrow annular clearance for a long time and is better mixed. A region of the head portion, which conically narrows toward the transporting section, leads to a continuous widening of the annular clearance. The resulting pressure gradient provides for a continuous transportation of the mortar mass toward the transporting section, where it is quickly transported away backwards toward the compression section.

The transporting arrangement is advantageously provided in the largest diameter region of the head portion and is formed by an appropriate shaping of the circumferential surface of the cylindrical section of the head portion. The shaping of the circumferential surface of the largest diameter region facilitate the transportation of the mortar mass to the transporting section. Simultaneously, this profile promotes intermixing of the mortar mass released from the sheath.

In a simply produced and preferable embodiment of the invention, the profile of the circumferential surface is formed as a knurling in a form of substantially axially extending grooves which extend from the free end to the transporting section. The knurling can be very easily formed e.g., by cold rolling. Simultaneously, the outer diameter of the treated region of the head portion increases to a desired extent.

For the mixing process and for the transportation of the mortar mass, it is advantageous when the knurling forming grooves have a depth of from about 0.5 mm to about 2.5 mm and a largest width from about 1 mm to about 3 mm. The grooves have flanks sloping from the grove bores toward the outer surface, with the flanks of adjacent grooves forming obtuse angles the peaks of which lie on the circumferential surface and define substantially axially extending edges which facilitate the comminution of the sheath. In particular, when foil sheathes are used the sharp edges formed on the circumference of the head portion help in the comminution of the foil.

In an alternative embodiment of the invention, the transporting arrangement is formed by a thread-like profile of the circumferencial surface of the head portion, the rotation direction of which corresponds to the rotational direction of a coarse thread-like profile of the transporting section. In the thread-like profile of the head portion, the mortar mass is transported as in a screw conveyer and is mixed at the same time. Because both the thread-like profile of the head portion and the coarse thread-like profile of the transporting section have the same rotational direction, the transportation of the mortar mass from the free end of the anchor rod over the entire anchoring region is not obstructed in any way.

The coarse thread-like profile of the transporting section advantageously has a larger pitch and a larger depth than the thread-like profile of the head portion. These constructive features provide for clear separation of the mixing section and the transporting section. The mortar mass components are well intermixed, by the finer thread region formed on the head portion. In the transporting section having a coarse thread-like profile, only transportation of the mixed mortar mass away takes place. The large thread pitch and the relatively large thread depth are designed only for a quick transportation of a large amount of mortar. Therefore, in the transporting region, practically hardly any significant further intermixing of the mortar mass takes place.

The anchor rod according to the invention can be secured in the prepared receiving bore in a very simple way and without any additional auxiliary means. Simply, only a percussion drilling tool is needed, which is already available for forming the receiving bore. The anchor rod is inserted with its trailing end in a chuck of the percussion drilling tool. The setting of the anchor rod into the receiving bore with the already placed mortar sheath is effected by pushing the anchor rod into the receiving bore by drilling and percussion action.

The thread pitch of the coarse thread-like profile of the transporting section can diminish toward the compression section. Thereby, the transportation speed of the mixed mortar mass distributed over the anchoring region slows down toward the trailing end, whereby a certain pre-compression of the mortar mass takes place. This further assists the action of the compression section, and it insures that no flow of the mortar mass out of the receiving bore takes place and no soiling of the attachment section of the anchor rod occurs. The diminishing of the thread pitch in the direction of the compression section requires shortening of the cone-like regions of the transporting section. Also, the compression section can be provided with at least one cone-shaped region widening toward the free end. This cone promotes a secondary expansion behavior of the attachment anchor necessary for increasing the holding force, e.g., in torn concrete. The cutter at the free end is preferably formed by a wedge-shaped bevel of the head portion which extends up to the circumferential surface of the head portion. The cutter is suitable for breaking and comminution of both glass sheathes and foil sheathes in which mortar components are stored. Because the bevel extends relative to the anchor rod axis under an angle of about 45°, the axial impacts of the percussion drilling tool are particularly well transmitted to the sheath, and the sheath is comminuted during the rotation of the anchor rod, without blocking it. To provide for separation of the anchor rod and the mortar mass in case of fissures and to be able to expand the anchor rod further, the outer surface of the anchoring region is formed non-adhesive with respect to the organic and/or inorganic mortar mass. From the manufacturing point of view, it is advantageous when the outer surface of the anchoring region is galvanically bright nickel-plated. This manufacturing step can be economically integrated in series production. The anchor rod has the desired surface characteristics and is protected against corrosion.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 3 is an elevational view of a second embodiment of an anchor rod according to the present invention.

DETAILED DESCRIPTION OP THE PREFERRED EMBODIMENTS

Figure 1:
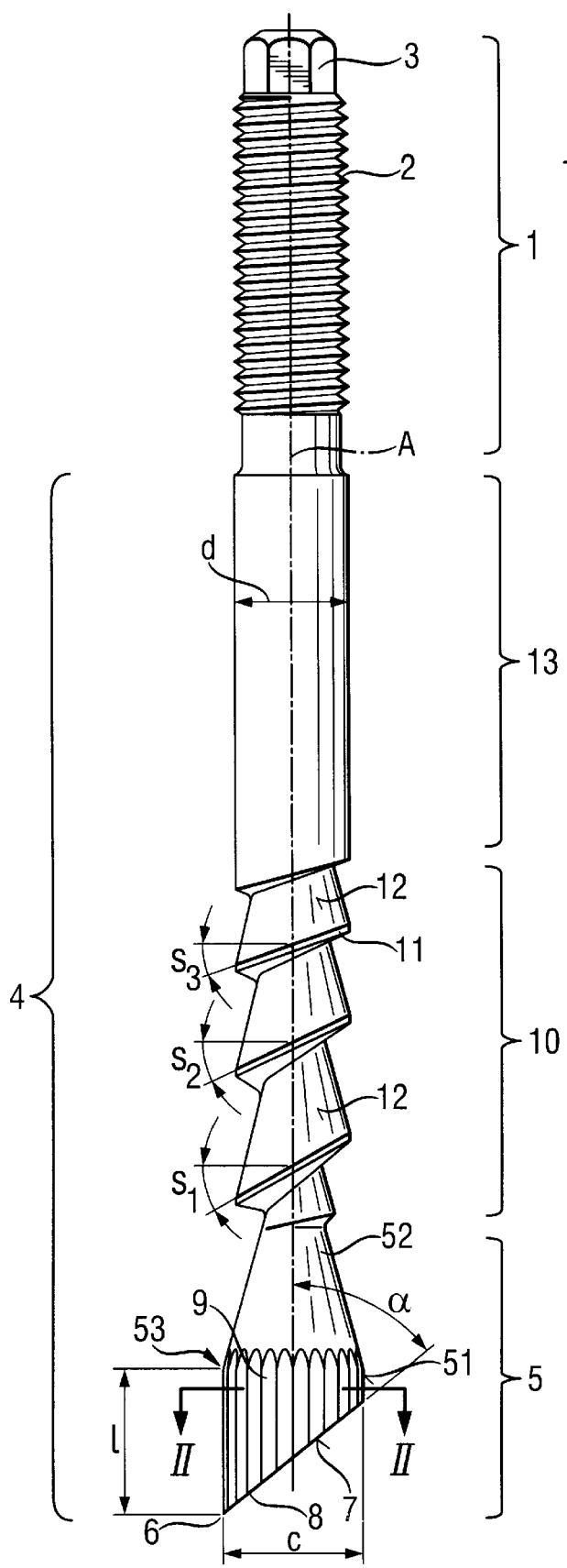
FIG. 1 is an elevational view of a first embodiment of an anchor rod according to the present invention.

Exemplary embodiments of an anchor rod for an attachment anchor, and according to the present invention, which are shown in FIGS. 1 and 3, have a trailing attachment region 1 which is provided with an outer thread 2 forming load application means. The trailing end of the anchor rod which in a setting condition, as a rule, projects from a receiving bore, is formed as an attachment end 3, with which the anchor rod is inserted into a chuck of a rotary drilling tool (not shown), e.g., a hammer drill of the assignee of the present invention, for setting purposes. An anchoring region 4, which is put into a hardenable organic and/or inorganic mortar mass and, in a setting condition, is embedded in the hardened mortar mass, adjoins the attachment region 1.

A frontmost section of the anchoring region 4, which is adjacent to the bore bottom, is formed as a mixing section and includes a head portion 5 at the free front end 6 of which a cutter 7, which extends somewhat transverse to the axis A of the anchor rod, is provided. For forming the cutter 7, the head portion 5 is provided in its front region with a bevel 8 which is inclined relative to the axis A at an angle $\alpha$, preferably at about 45°, and which extends up to the circumferential surface 51 of the head portion 5. The head portion has a section 52, which conically expands in the direction toward the front end 6 and which opens into a cylindrical region 53. The cutter 7 is provided at the face end of the cylindrical region 53 of the head portion 5. The cylindrical region 53 has a length l, which takes up from about 50% to about 75% of the axial length of the head portion.

The head portion 5 is adjoined by a transporting section 10 which has a profile of a coarse thread 11. The rotational direction of the thread 11 is so selected that the mortar mass during the rotation of the anchor rod about its axis A, as in a feed screw, is transported away from the head portion 5 toward the trailing, rear end of the anchor rod. The thread 11 is formed by cone-like sections 12 which widen in the direction of the front end 6 of the anchor rod.

The transporting section 10 is adjoined at its rear end by a compression section 13 which serves as a stop for the transportable mortar mass. In the embodiment shown in FIG. 1, the compression section 13 is formed as a substantially cylindrical section and has a diameter which somewhat corresponds to the outer diameter of the trailing or rear attachment region 1 provided with an outer thread 2. In the embodiment show in FIG. 3, the compression section 13 is provided at least one cone 14 which adjoins a constriction formed on the anchor rod at the beginning of the compression section 13 and which widens in the direction of the free front end 6. As shown, by way of an example, a reverse cone 15 adjoins the cone 14 at its largest diameter region. The cone 15 tapers toward the rearmost cone section of the coarse thread 11. The axial length b of the reverse 15 takes up from about ¼ to about ⅔ of the length a of the cone 14 in the compression section 13. While in FIG. 3 only one cone 14 with a reverse cone 15 is shown, a plurality of cones with associated reverse cones can be arranged one after another. These cones can have the same length. However, the lengths can decrease in the direction toward the attachment region 1. In the embodiment of the anchor rod shown in FIG. 3, the largest diameter d of the compression section 13 is the diameter of the cone 14.

In both shown embodiments of the anchor rod, the cylindrical region 53 of the head portion 5 has a diameter c which is larger than the largest diameter d of the section 10, 13 of the anchoring region 4. In the embodiment of the anchor rod shown in FIG. 3, the largest diameter d of the transporting section 10 and the compression section 13 is defined by the diameter of the cone 14 at the beginning of the compression section 13. The ratio of the outer diameter c to the largest diameter d of the conventional sections 10, 13 of the anchoring region 4 is from about 1.05 to about 1.07.

Besides the differently formed compression section, a further substantial difference between the embodiments of the anchor rod shown in FIGS. 1 and 3 is in the shape of the transporting arrangement 9 which is provided in the largest diameter region 53 of the head portion 5. According to FIG. 1, the transporting arrangement, 9 is formed by a knurling of the circumferential surface 51. The knurling is formed by somewhat axially extending grooves 90 which extend from the free front end 6, which is provided with the cutter 7 toward the conical section 52 of the head portion 5.

Figure 2:
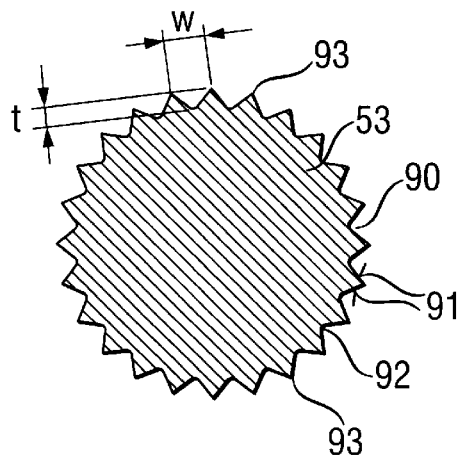
FIG. 2 is a cross-sectional view along line II—II in FIG. 1.

As shown in the cross-sectional view of FIG. 2, the grooves 90 have flanks 91 which slopes from the groove bores 92 toward the circumferential surface 51. The flanks 91 of the adjacent grooves 90 form, at the circumferential surface 52 acute angles defining sharp edges 93. The circumferential surface 52, which is provided in this way with a toothed rack, assists, during the rotation of the anchor rod in the receiving bore, in comminution of a sheath, e.g., a plastic foil. The depth of the grooves 90 is from about 0.5 mm to about 2.5 mm. The largest width of the grooves 90 is from about 1 mm to about 3 mm.

In the embodiment of an anchor rod according to the present invention shown in FIG. 3, the transporting arrangement is formed of a thread-like profile 95 provided on the circumferential surface 51 of the cylindrical region 53 of the head portion 5. The thread-like profile 95 has the same rotational direction as the course thread 11 of the transporting section 10. The pitch s1, s2, s3 of the coarse thread 11 and its depth are bigger than the pitch and the depth of the thread-like profile of the circumferential surface 51 of the cylindrical region 53 of the rear portion 5.

The anchor rod according to the present invention, which was described with reference to the two exemplary embodiments, insures a reliable comminution of the sheath in which the mortar mass or its components are contained. The geometrical shape of the anchoring region of the anchor rod according to the present invention insures a deep mixing of separate components of a mortar system formed of two or more components. The mixed mortar mass is uniformly distributed over the anchoring region of the anchor rod and its displacement out of the receiving bore is prevented. The geometry of the anchor rod according to the present invention, promotes a secondary expansion behavior of the anchor rod, whereby a sufficiently high holding value is insured even in a torn constructional component with an opening fissure. Because the outer surface of the anchoring region is so treated that it has a non-adhesive characteristic with respect to the hardened mortar mass, the secondary expansion characteristic of the anchor rod can be further improved. Advantageously, the outer surface of the anchor rod, at least in its anchoring region, is galvanically bright nickel-plated and/or chromium-plated.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An anchor rod for an attachment anchor, comprising a trailing region (1) provided with load application means (2), an anchoring region (4) submergible in at least one of hardenable inorganic mortar mass and organic mortar mass, the anchoring region (4) including a front mixing section (5), a transporting section (10) adjoining the mixing section, and a compression section (13) adjoining the transporting section (10), the transporting section having a profile of a coarse thread with a pitch such that upon rotation of the anchor rod the mortar mass is capable of being transported away from the mixing section toward the trailing region of the anchor rod, and the mixing section (5) being formed as a head portion provided at a free end (6) thereof with a cutter (7) extending substantially transverse to the axis (A) of the anchor rod, and the head portion having a region (53), an outer diameter (c) of which is larger than a largest diameter (d) of the transporting section (10) and the compression section (13), and a transporting arrangement (9) for the mortar mass, wherein the outer diameter (c) of the region (53) of the head portion (5) exceeds the largest diameter (d) of the adjoining transporting (10) and compression (13) sections from about 1.05 times to about 1.07 times.

2. An anchor rod for an attachment anchor, comprising a trailing region (1) provided with load application means 92), an anchoring region (4) submergible in at least one of hardenable inorganic mortar mass and organic mortar mass, the anchoring region (4) including a front mixing section (5), a transporting section (10) adjoining the mixing section, and a compression section (13) adjoining the transporting section (10), the transporting section having a profile of a coarse thread with a pitch such that upon rotation of the anchor rod the mortar mass is capable of being transported away from the mixing section toward the trailing region of the anchor rod, and the mixing section (5) being formed as a head portion provided at a free end (6) thereof with a cutter (7) extending substantially transverse to the axis (A) of the anchor rod, and the head portion having a region (53), an outer diameter (c) of which is larger than a largest diameter (d) of the transporting section (10) and the compression section (13), and a transporting arrangement (9) for the mortar mass, wherein the transporting section (10) includes a plurality of cone-like sections (12) which widens in a direction toward the free end (6) of the anchor rod.

3. An anchor rod for an attachment anchor, comprising a trailing region (1) provided with load application means (2), an anchoring region (4) submergible in at least one of hardenable inorganic mortar mass and organic mortar mass, the anchoring region (4) including a front mixing section (5), a transporting section (10) adjoining the mixing section, and a compression section (13) adjoining the transporting section (10), the transporting section having a profile of a coarse thread with a pitch such that upon rotation of the anchor rod the mortar mass is capable of being transported away from the mixing section toward the trailing region of the anchor rod, and the mixing section (5) being formed as a head portion provided at a free end (6) thereof with a cutter (7) extending substantially transverse to the axis (A) of the anchor rod, and the head portion having a region (53), an outer diameter (c) of which is larger than a largest diameter (d) of the transporting section (10) and the compression section (13), and a transporting arrangement (9) for the mortar mass, wherein the head portion (5) has a portion conically widening toward the free end (6) and opening into the largest diameter region (53) having a cylindrical shape and a length (l) which takes up from about 50% to about 75% of a total length of the head portion (5).

4. An anchor rod for an attachment anchor, comprising a trailing region (1) provided with load application means (2), an anchoring region (4) submergible in at least one of hardenable inorganic mortar mass and organic mortar mass, the anchoring region (4) including a front mixing section (5), a transporting section (10) adjoining the mixing section, and a compression section (13) adjoining the transporting section (10), the transporting section having a profile of a coarse thread with a pitch such that upon rotation of the anchor rod the mortar mass is capable of being transported away from the mixing section toward the trailing region of the anchor rod, and the mixing section (5) being formed as a head portion provided at a free end (6) thereof with a cutter (7) extending substantially transverse to the axis (A) of the rod, and the head portion having a region (53), an outer diameter (c) of which is larger than a largest diameter (d) of the transporting section (10) and the compression section (13), and a transporting arrangement (9) for the mortar mass, wherein the transporting arrangement (9) is provided in the largest diameter region (53) of the head portion (5) and is formed by an appropriate profile of a circumferential surface (51) of the largest diameter region (53).

5. An anchor rod according to claim 4, wherein the profile of the circumferential surface (51) is a knurling defined by grooves (90) axially extending from the free end (6) toward the transporting section (10).

6. An anchor rod according to claim 5, wherein the grooves (90) have a depth (t) from about 0.5 mm to about 2.5 mm and a largest width (w) from about 1 mm to about 3 mm, the grooves (90) having flanks (91) sloping from a groove bottom (92) toward the circumferential surface (51), with the flanks (91) of the adjacent grooves (90) meeting at the circumferential surface (51) and forming acute angles and defining edges (93) which extend substantially axially along the circumferential surface (51).

7. An anchor rod for an attachment anchor, comprising a trailing region (1) provided with load application means (2), an anchoring region (4) submergible in at least one of hardenable inorganic mortar mass and organic mortar mass, the anchoring region (4) including a front mixing section (5), a transporting section (10) adjoining the mixing section, and a compression section (13) adjoining the transporting section (10), the transporting section having a profile of a coarse thread with a pitch such that upon rotation of the anchor rod the mortar mass is capable of being transported away from the mixing section toward the trailing region of the anchor rod, and the mixing section (5) being formed as a head portion provided at a free end (6) thereof with a cutter (7) extending substantially transverse to the axis (A) of the rod, and the head portion having a region (53), an outer diameter (c) of which is larger than a largest diameter (d) of the transporting section (10) and the compression section (13), and a transporting arrangement (9) for the mortar mass, wherein the transporting arrangement (9) is formed by a thread-like profile (95) of a circumferential surface (51) of the region (53) of the head portion (5), with a rotational direction of the coarse thread-like profile (95) corresponding to a rotational direction of a coarse thread-like profile of the transporting section (10).

8. An anchor rod according to claim 7, wherein the coarse thread-like profile (11) of the transporting section (10) has larger pitch ($S_1$, $S_2$, $S_3$) and depth (t) than those of the thread-like profile (95) of the head portion.

9. An anchor rod for an attachment anchor, comprising a trailing region (1) provided with load application means (2), an anchoring region (4) submergible in at least one of hardenable inorganic mortar mass and organic mortar mass, the anchoring region (4) including a front mixing section (5), a transporting section (10) adjoining the mixing section, and a compression section (13) adjoining the transporting section (10), the transporting section having a profile of a coarse thread with a pitch such that upon rotation of the anchor rod the mortar mass is capable of being transported away from the mixing section toward the trailing region of the anchor rod, and the mixing section (5) being formed as a head portion provided at a free end (6) thereof with a cutter (7) extending substantially transverse to the axis (A) of the rod, and the head portion having a region (53), an outer diameter (c) of which is larger than a largest diameter (d) of the transporting section (10) and the compression section (13), and a transporting arrangement (9) for the mortar mass, wherein the anchoring region (4) has an outer surface which is non-adhesive with respect to the at least one of organic mortar mass and inorganic mortar mass.

10. An anchor rod according to claim 9, wherein the outer surface of the anchoring region (4) is galvanically at least one of bright, nickel-plated and chromium-plated.

* * * * *